US012782508B2

(12) United States Patent
Watanabe et al.

(10) Patent No.: US 12,782,508 B2
(45) Date of Patent: Nov. 3, 2026

(54) TRANSMISSION APPARATUS WITH REFLECTION UNITS INCLUDING A RECONFIGURABLE INTELLIGENT METASURFACE REFLECTING PLATE, AND TRANSMISSION METHOD FOR THE SAME

(71) Applicant: NEC Corporation, Tokyo (JP)

(72) Inventors: Shingo Watanabe, Tokyo (JP); Masakazu Ono, Tokyo (JP); Kenji Wakafuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 18/543,034

(22) Filed: Dec. 18, 2023

(65) Prior Publication Data

US 2024/0210523 A1 Jun. 27, 2024

(30) Foreign Application Priority Data

Dec. 22, 2022 (JP) ................................ 2022-205274

(51) Int. Cl.
*G01S 7/40* (2006.01)
*H01Q 3/26* (2006.01)
*H01Q 15/16* (2006.01)

(52) U.S. Cl.
CPC ........... *G01S 7/4008* (2013.01); *H01Q 3/267* (2013.01); *H01Q 15/16* (2013.01)

(58) Field of Classification Search
CPC ....... G01S 7/4008; H01Q 3/267; H01Q 15/16
USPC .......................................................... 342/350
See application file for complete search history.

(56) References Cited

U.S. PATENT DOCUMENTS

| | | | | |
|---|---|---|---|---|
| 10,490,903 | B2 | 11/2019 | Foo | |
| 10,938,105 | B2 | 3/2021 | Snyder et al. | |
| 12,015,202 | B2 * | 6/2024 | Bhattacharyya ..... | H01Q 15/162 |
| 2003/0227859 | A1 | 12/2003 | Hirai | |
| 2016/0372835 | A1 * | 12/2016 | Toso ...................... | H01Q 15/16 |

(Continued)

FOREIGN PATENT DOCUMENTS

| | | |
|---|---|---|
| JP | 2010-521915 A | 6/2010 |
| JP | 2020-136687 A | 8/2020 |

(Continued)

OTHER PUBLICATIONS

US Office Communication for U.S. Appl. No. 18/656,680, mailed on Sep. 3, 2025.

(Continued)

*Primary Examiner* — Brady W Frazier
(74) *Attorney, Agent, or Firm* — Sughrue Mion, PLLC

(57) ABSTRACT

An amplifier amplifies an input signal. A radiation unit radiates a radio wave into space, based on the input signal amplified by the amplifier. A first reflection unit reflects the radio wave radiated from the radiation unit. A second reflection unit configured as a reconfigurable intelligent metasurface (RIS) reflecting plate reflects the radio wave from the first reflection unit and thereby transmits the radio wave to a transmission target. A control unit controls the second reflection unit. The second reflection unit reflects the radio wave at a target reflection angle that represents a reflection angle toward the transmission target, by reflecting the radio wave at a reflection angle acquired by adding an offset to a reflection angle specified by the control unit, based on the target reflection angle.

6 Claims, 16 Drawing Sheets

(56) References Cited

U.S. PATENT DOCUMENTS

| | | | | |
|---|---|---|---|---|
| 2018/0356515 | A1* | 12/2018 | Martinez-Lorenzo | G01S 13/06 |
| 2023/0144085 | A1* | 5/2023 | Dutta | G01S 3/14 342/350 |
| 2024/0213671 | A1 | 6/2024 | Watanabe et al. | |
| 2024/0405429 | A1 | 12/2024 | Watanabe et al. | |
| 2025/0007567 | A1 | 1/2025 | Haustein et al. | |

FOREIGN PATENT DOCUMENTS

| | | |
|---|---|---|
| JP | 2021-517406 A | 7/2021 |
| JP | 2022-117980 A | 8/2022 |

OTHER PUBLICATIONS

US Office Action for U.S. Appl. No. 18/539,720, mailed on Jun. 4, 2025.

Marco Rossanese et al., “Designing, Building, and Characterizing RF Switch-based Reconfigurable Intelligent Surfaces”, Jul. 14, 2022, arXiv, <URL https://arxiv.org/abs/2207.07121v1>.

“The Institute of Electronics, Information and Communication Engineers Knowledge Base, Group 10, Chapter 8, Section 8, Phase shifters and Antennas”, The Institute of Electronics, Information and Communication Engineers, [retrieved on Dec. 16, 2022], <URL: https://www.leice-hbkb.org/files/10/10gun_08hen_08.pdf>.

* cited by examiner

TAB

| REFLECTION ANGLE | | PHASE SHIFT SETTING VALUE | | | | | | | | | |
|---|---|---|---|---|---|---|---|---|---|---|---|
| | | REFLECTIVE ELEMENT UNIT E1 | | | REFLECTIVE ELEMENT UNIT E2 | | | • • • | REFLECTIVE ELEMENT UNIT EN | | |
| $\phi$ | $\theta$ | REFERENCE VALUE | OFFSET VALUE | REFLECTION ON/OFF | REFERENCE VALUE | OFFSET VALUE | REFLECTION ON/OFF | • • • | REFERENCE VALUE | OFFSET VALUE | REFLECTION ON/OFF |
| ** | ** | ** | **** | * | ** | **** | * | • • • | ** | **** | * |
| ** | ** | ** | **** | * | ** | **** | * | • • • | ** | **** | * |
| ** | ** | ** | **** | * | ** | **** | * | • • • | ** | **** | * |
| ** | ** | ** | **** | * | ** | **** | * | • • • | ** | **** | * |
| ** | ** | ** | **** | * | ** | **** | * | • • • | ** | **** | * |
| ** | ** | ** | **** | * | ** | **** | * | • • • | ** | **** | * |
| | | | | | | | | | | | |

Fig. 8

TRANSMISSION APPARATUS WITH REFLECTION UNITS INCLUDING A RECONFIGURABLE INTELLIGENT METASURFACE REFLECTING PLATE, AND TRANSMISSION METHOD FOR THE SAME

INCORPORATION BY REFERENCE

This application is based upon and claims the benefit of priority from Japanese patent application No. 2022-205274, filed on Dec. 22, 2022, the disclosure of which is incorporated herein in its entirety by reference.

TECHNICAL FIELD

The present disclosure relates to a transmission apparatus, a calibration system for a transmission apparatus, and a transmission method.

BACKGROUND ART

With advancement of communication technology, various methods for transmitting and receiving radio signals have been proposed.

For example, Japanese Unexamined Patent Application Publication No. 2022-117980 discloses the following as a technique for estimating a location of a user terminal. A reconfigurable intelligent surface (RIS) panel reflects a pilot signal transmitted from an access point, according to a predetermined reflection pattern. Upon receiving the reflected signal, a user terminal extracts features from the signal, and estimates a location of the user terminal, based on a database including a pair of a location and one or more features.

Published Japanese Translation of PCT International Publication for Patent Application, No. 2010-521915 discloses a vehicle-mounted antenna including a transmitter for generating a transmission signal, main and sub reflectors, and a waveguide associated with the transmitter for conducting the transmission signal toward the sub reflector.

SUMMARY

Recently, beamforming of a 5th-generation (5G) base station is achieved by, for example, a configuration using a solid state power amplifier (SSPA) and a phased array antenna. However, as the communication frequency becomes high, it is assumed that more heat dissipation occurs during operation, due to an increase in the number of communication elements such as antennas and amplifiers, or an increase in integration of devices.

As a solution to such a problem, a technique is conceivable in which an RIS unit capable of directionally controlling a reflected wave is provided, and a radio wave radiated from an antenna is reflected by the RIS unit. This technique enables the reflected radio wave to be propagated to a target at a desired location while suppressing the above-described phenomenon of multi-element or high integration.

However, in order to reflect the radio wave in a desired direction, an amount of phase shift to be applied to the radio wave in a plurality of reflective element units arranged in the RIS unit needs to be controlled accurately. Therefore, a function of controlling a reflection angle of the reflected radio wave by adjusting, i.e., calibrating the amount of phase shift applied to each radio wave in the reflective element unit is required.

The present disclosure has been made in view of the above circumstances, and an example object of the present disclosure is to provide a transmission apparatus and a transmission method capable of controlling a reflection angle of a radio wave to be reflected by an RIS unit, and a calibration system for the transmission apparatus.

In a first example aspect of the present disclosure, a transmission apparatus includes: an amplifier configured to amplify an input signal; a radiation unit configured to radiate a radio wave into space, based on the input signal amplified by the amplifier; a first reflection unit configured to reflect the radio wave radiated from the radiation unit; a second reflection unit configured as a reconfigurable intelligent metasurface (RIS) reflecting plate to reflect the radio wave from the first reflection unit and thereby transmit the radio wave to a transmission target; and a control unit configured to control the second reflection unit, in which the second reflection unit reflects the radio wave at a reflection angle acquired by adding an offset to a reflection angle that indicated by the control unit based on the target reflection angle that represents a reflection angle toward the transmission target to reflect the radio wave at the target reflection angle.

In a second example aspect of the present disclosure, a transmission method for a transmission apparatus including an amplifier configured to amplify an input signal, a radiation unit configured to radiate a radio wave into space, based on the input signal amplified by the amplifier, a first reflection unit configured to reflect the radio wave radiated from the radiation unit, and a second reflection unit configured to reflect the radio wave from the first reflection unit and thereby transmit the radio wave to a transmission target, the transmission method includes: indicating, to the second reflection unit, a reflection angle acquired by adding an offset to a reflection angle indicated based on a target reflection angle representing a reflection angle toward the transmission target; and reflecting the radio wave, by the second reflection unit, based on the indicated reflection angle, to reflect the radio wave at the target reflection angle.

An example advantage according to the present disclosure is to provide a transmission apparatus and a transmission method capable of controlling a reflection angle of a radio wave to be reflected by an RIS unit, and a calibration system for the transmission apparatus.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 8 is a diagram illustrating an example of table information in which an offset amount is stored;

EXAMPLE EMBODIMENT

Figure 1:
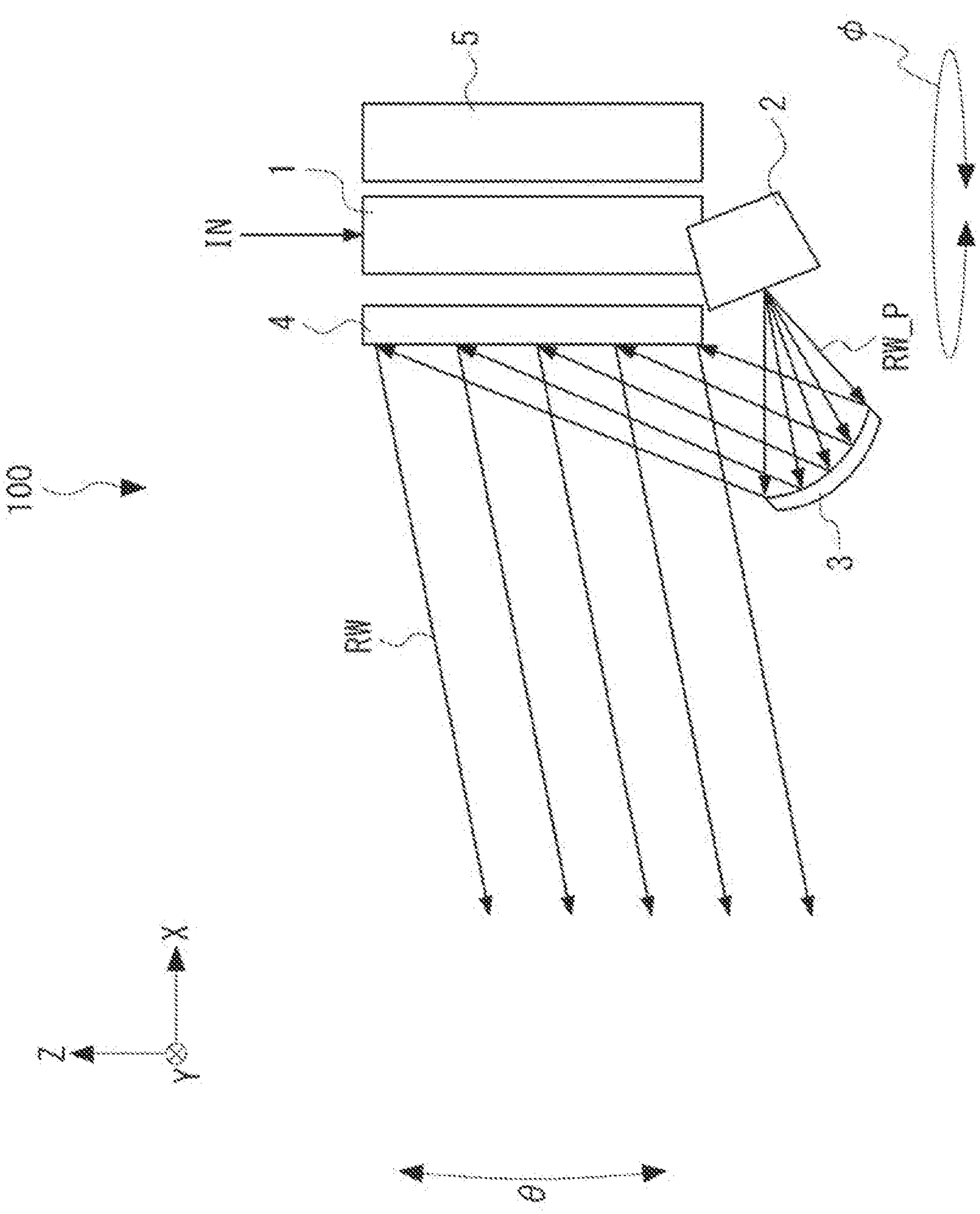
FIG. 1 is a diagram schematically illustrating an overview configuration of a transmission apparatus according to a first example embodiment.

Hereinafter, example embodiments of the present disclosure will be described with reference to the drawings. In the drawings, the same element is denoted by the same reference numeral, and redundant description is omitted as necessary.

First Example Embodiment

A transmission apparatus according to a first example embodiment will be described. A transmission apparatus 100 according to the present example embodiment is configured to irradiate a reconfigurable intelligent metasurface (RIS) reflecting plate with radio waves and transmit the radio waves reflected by the RIS reflecting plate in a desired direction. In the RIS reflecting plate, reflective element units are arranged in an array, and radio waves are able to be deflected in the desired direction, similarly to a phased array antenna, by controlling a phase shift amount being applied to the radio wave reflected by each reflective element unit.

In the following description, a direction toward the right of the drawing is defined as an X direction, a direction toward the top is defined as a Z direction, and a direction from the front to the back of the drawing is defined as a Y direction. A rotation direction around the Z-axis, that is, an azimuth direction of the transmission apparatus 100, is defined as a pan direction q, and a rotation direction around an axis parallel to the X-Y plane, that is, an elevation/depression angle direction of the transmission apparatus 100, is defined as a tilt direction θ.

Figure 2:
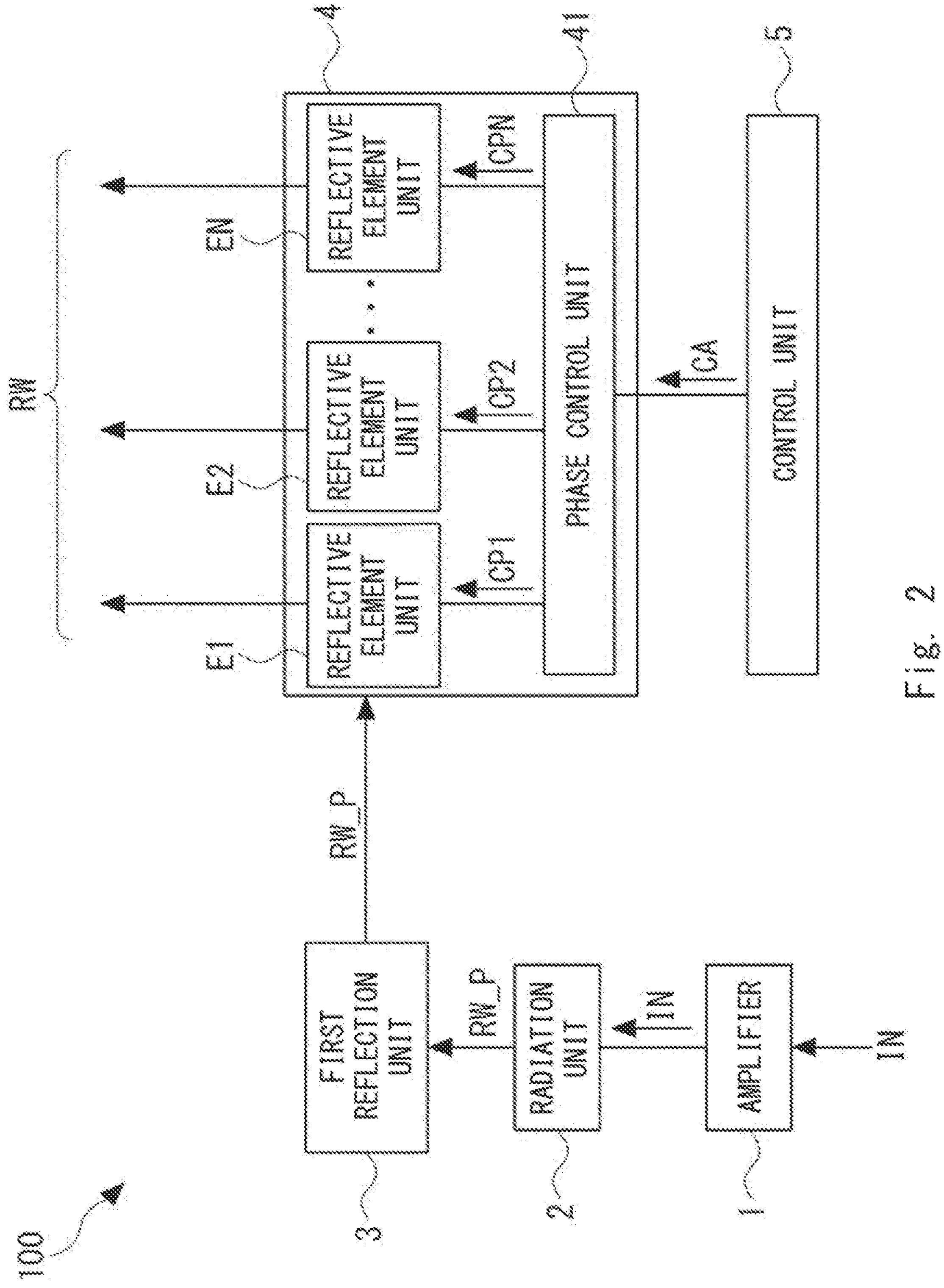
FIG. 2 is a diagram schematically illustrating a functional configuration of the transmission apparatus according to the first example embodiment.

FIG. 1 schematically illustrates an overview configuration of the transmission apparatus 100 according to the first example embodiment. FIG. 2 schematically illustrates a functional configuration of the transmission apparatus 100 according to the first example embodiment. The transmission apparatus 100 includes an amplifier 1, a radiation unit 2, a first reflection unit 3, a second reflection unit 4, and a control unit 5.

The amplifier 1 amplifies an input RF signal IN and outputs the amplified RF signal IN to the radiation unit 2. The amplifier 1 is configured as, for example, a high-power amplifier such as a traveling-wave tube amplifier (TWTA). In the present example embodiment, by using a TWTA, it is possible to configure a transmission apparatus having a higher output than in a case of using an SSPA.

The radiation unit 2 is configured as an antenna that radiates the RF signal amplified by the amplifier 1 as a radio wave RW_P.

The radiated radio wave RW_P is reflected by the first reflection unit 3 and enters the second reflection unit 4. Although the radio wave RW_P radiated from the radiation unit 2 is a spherical wave, due to being reflected by the first reflection unit 3 having a concave shape, the radio wave RW_P enters the second reflection unit 4 as a substantially planar wave.

The second reflection unit 4 is configured as a reconfigurable intelligent metasurface (RIS) reflecting plate, and reflects the incident radio wave RW_P at a target reflection angle θ, as a radio wave RW.

The control unit 5 controls the reflection angle of the radio wave RW being reflected by the second reflection unit 4 by providing a reflection angle control signal CA to the second reflection unit 4.

Next, the configuration of the second reflection unit 4 will be described. The second reflection unit 4 includes a plurality of reflective element units and a phase control unit 41 configured to control phase conversion of the plurality of reflective element units.

The second reflection unit 4 is configured by arranging the plurality of reflective element units in an array-shape on a two-dimensional plane. In the following, N is an integer of 2 or more. In FIG. 2, for the sake of simplicity, the reflective element units E1 to EN are displayed side by side in one direction. Each of the reflective element units E1 to EN controls the reflection direction of the radio wave RW, that is, the propagation direction, by adjusting the phase of the radio wave RW_P being incident from the first reflection unit 3 and then radiating the adjusted radio wave RW_P.

Figure 3:
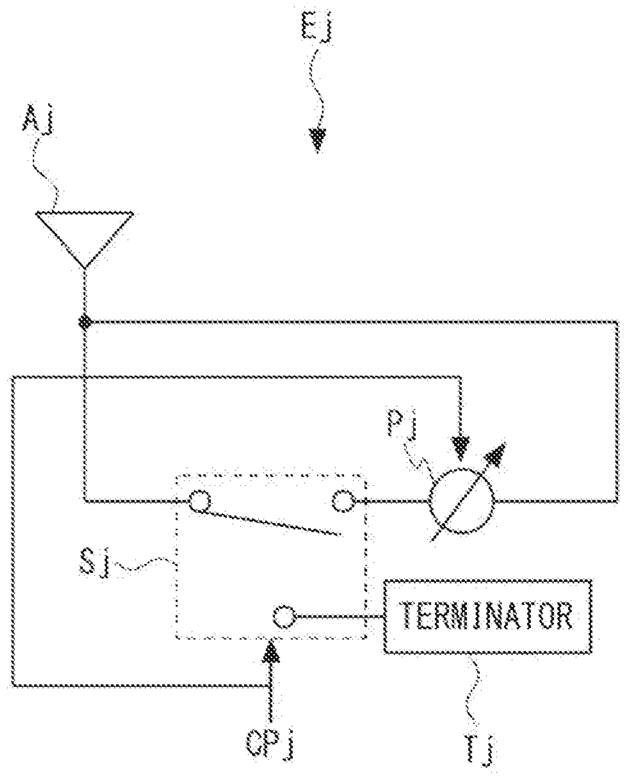
FIG. 3 is a diagram schematically illustrating a configuration of a reflective element unit.

Hereinafter, a reflective element unit Ej will be described as a common configuration of the reflective element units E1 to EN, where j is an integer of 1 or more and N or less. FIG. 3 schematically illustrates a configuration of the reflective element unit Ej. The reflective element unit Ej includes an antenna element Aj, a phase conversion unit Pj, a switch Sj, and a terminator Tj.

The radio wave RW_P incident from the first reflection unit 3 is received by the antenna element Aj, and is output as a reception signal RSj to one end of the switch Sj.

The switch Sj is able to be turned on/off in response to a control signal CPj, and thereby switches the input destination of the reception signal RSj to the phase conversion unit Pj or the terminator Tj.

Figure 4:
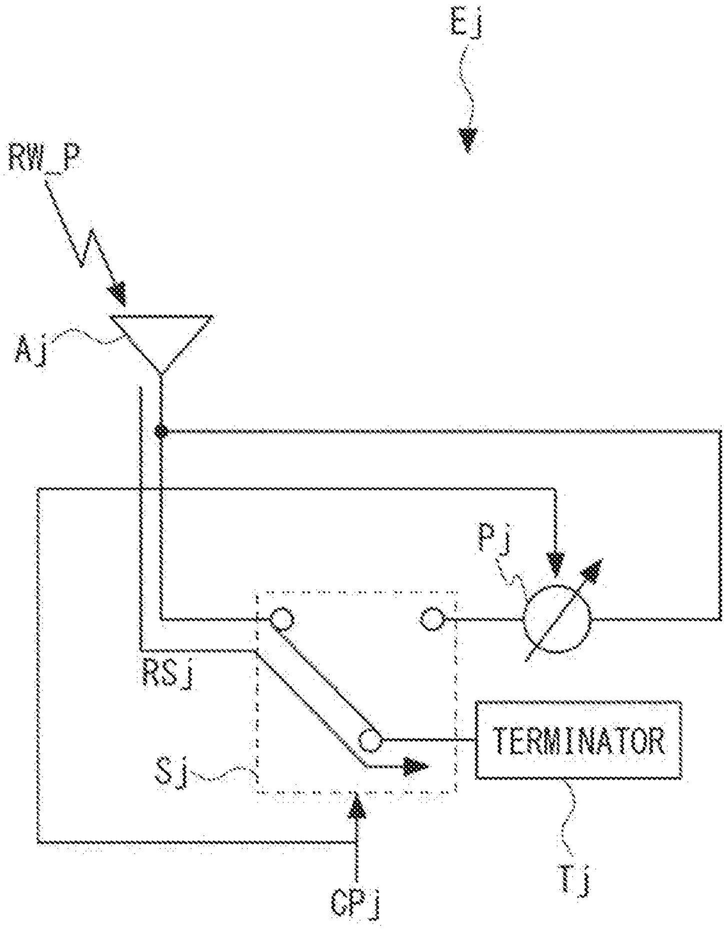
FIG. 4 is a diagram illustrating the reflective element unit in a case where a switch connects an antenna element and a terminator.

FIG. 4 illustrates the reflective element unit Ej in a case where the switch Sj connects the antenna element Aj and the terminator Tj. In such a case, the reception signal RSj is input from the antenna element Aj to the terminator Tj via the switch Sj, and the terminator Tj terminates the input reception signal RSj.

Figure 5:
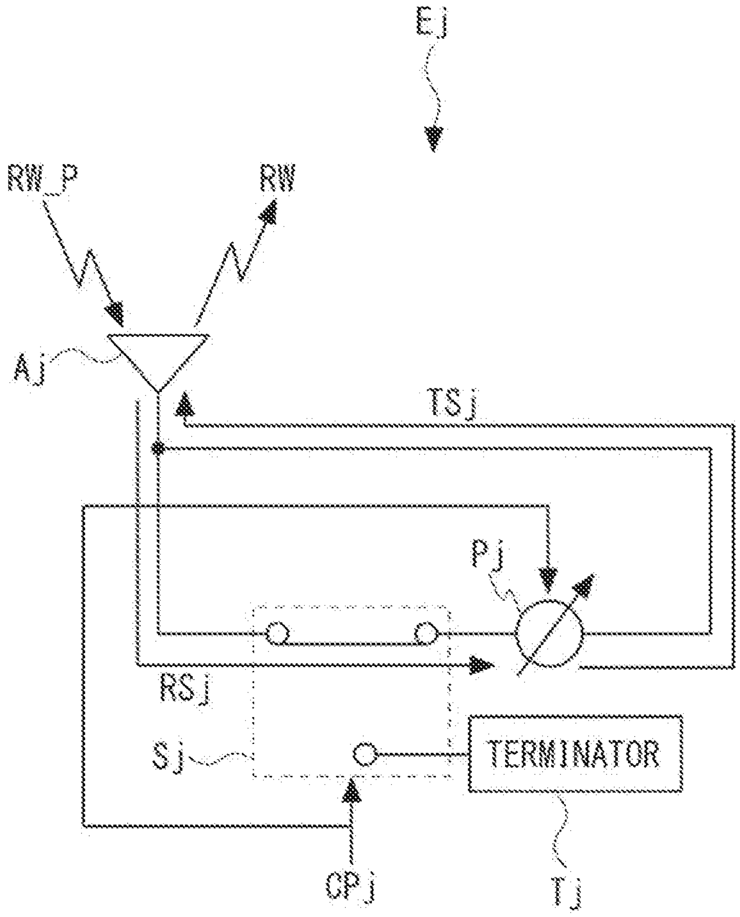
FIG. 5 is a diagram illustrating the reflective element unit in a case where the switch connects the antenna element and a phase conversion unit.

FIG. 5 illustrates the reflective element unit Ej in a case where the switch Sj connects the antenna element Aj and the input of the phase conversion unit Pj. In such a case, the reception signal RSj is input from the antenna element Aj to the phase conversion unit Pj via the switch Sj. The phase conversion unit Pj adjusts the phase shift amount being applied to the reception signal RSj in accordance with the control signal CPj, and outputs a transmission signal TSj, being a signal after the phase adjustment, to the antenna element Aj. The phase conversion unit Pj is configured as a variable phase conversion unit capable of continuously changing the phase shift amount being applied to the reception signal RSj in accordance with the control signal CPj.

The transmission signal TSj input to the antenna element Aj is radiated from the antenna element Aj as the radio wave RW.

The phase control unit 41 controls the phase shift amount that the phase conversion units T1 to TN apply to the reception signals RS1 to RSN, by applying the control signals CP1 to CPN to the phase conversion units T1 to TN in accordance with the reflection angle control signal CA.

The reflection angle control performed by the transmission apparatus 100 will be described. In the transmission apparatus 100, the control unit 5 controls the reflection angle of the radio wave RW by providing the reflection angle control signal CA to the phase control unit 41. However, it is assumed that an error may occur in the reflection angle of the radio wave due to the shape, manufacturing error, installation position, and the like of the first reflection unit 3 and the second reflection unit 4.

Figure 6:
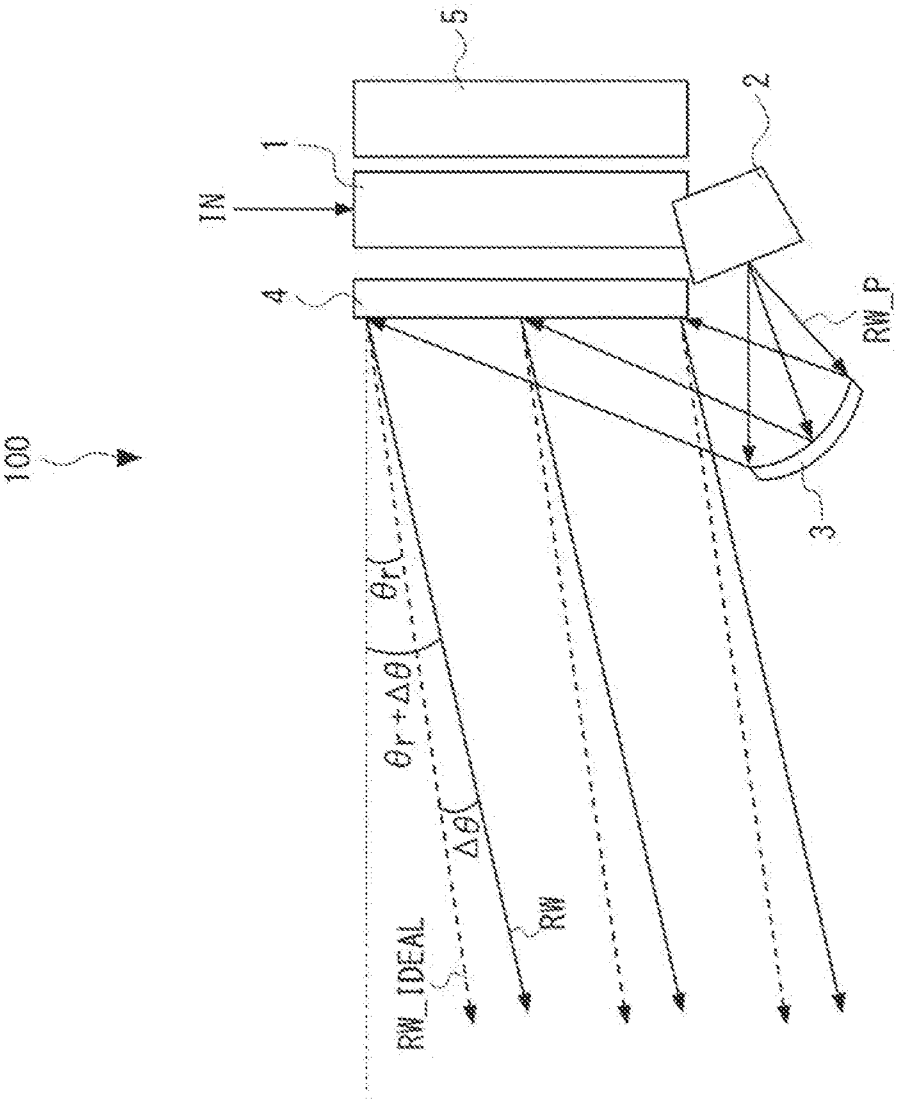
FIG. 6 is a diagram illustrating a deviation of a reflection angle of a radio wave in the transmission apparatus according to the first example embodiment.

FIG. 6 illustrates a deviation of the reflection angle of the radio wave in the transmission apparatus 100. FIG. 6 illustrates a radio wave RW IDEAL ideally reflected at a designated target reflection angle $\theta_r$ with regard to the radio wave RW reflected at an angle shifted from the target reflection angle $\theta_r$ by $\Delta\theta$. In this way, even when the reflection angle $\theta_r$ is indicated by the reflection angle control signal CA, for example, the radio wave RW is being shifted by the error $\Delta\theta$ and is reflected at an angle of $\theta_r+\Delta\theta$.

Figure 7:
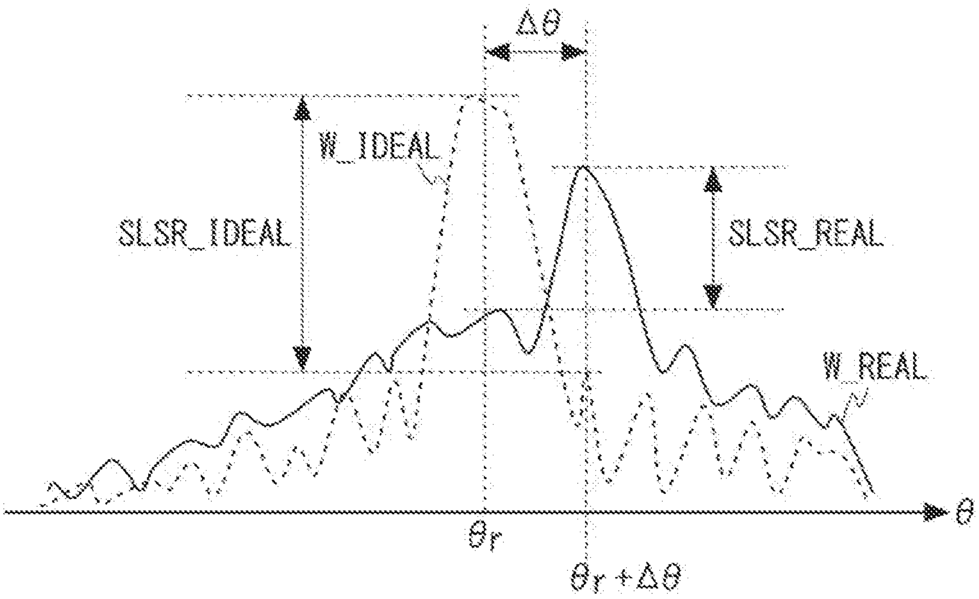
FIG. 7 is a diagram illustrating a radiation pattern of a radio wave reflected by the transmission apparatus according to the first example embodiment.

FIG. 7 illustrates a radiation pattern of the radio wave RW reflected by the transmission apparatus 100. In FIG. 7, W_REAL is a radiation pattern of the radio wave RW reflected by being shifted by the error $\Delta\theta$. W_IDEAL is an ideal radiation pattern of the radio wave RW in a case of being reflected at the target reflected angle $\theta_r$. In the radiation pattern W_REAL in which the reflection direction is shifted by $\Delta\theta$ and reflected, the peak value decreases as compared with the ideal radiation pattern W_IDEAL. In addition, in the radiation pattern W_REAL, the sidelobe also becomes large. Consequently, the sidelobe suppression ratio SLSR_REAL in the radiation pattern W_REAL is lower than the sidelobe suppression ratio SLSR_IDEAL of the ideal radiation pattern W_IDEAL.

Therefore, in the present configuration, when the target reflection angle $\theta_r$ is designated by the reflection angle control signal CA, the error $\Delta\theta$ is cancelled and the radio wave may be reflected toward the reflection angle $\theta_r$. Specifically, by indicating to the phase control unit 41 an offset angle $-\Delta\theta$, the error in each of the phase conversion units P1 to PN are able to be cancelled, and the radio wave RW may be reflected at the target reflection angle $\theta_r$ indicated by the reflection angle control signal CA.

Note that, herein, for the sake of simplification of the description, the reflection angle and the error of the radio wave RW are focused on $\theta$ which is the elevation and depression angle direction. However, due to the characteristics of the RIS reflecting plate, it is naturally possible to deflect the reflection direction of the RW also in the azimuth direction $\varphi$, and errors may also occur in this direction. Therefore, it goes without saying that the error is able to be cancelled in the azimuth direction $\varphi$ as well as in the elevation/depression direction $\theta$.

Specifically, the phase control unit 41 includes table information TAB in which the phase offset amounts indicated to the phase conversion units T1 to TN are stored. FIG. 8 illustrates an example of table information in which an offset amount is stored. The phase control unit 41 reads out the reference value and the offset value of the phase shift amount with respect to the indicated angle, and indicates, to the phase conversion units T1 to TN and by use of the control signals CP1 to CPN, the phase shift amount acquired by adding the reference value and the offset value.

As described above, according to the present configuration, by applying an offset to the phase shift amount in each of the reflective element units, it is possible to cancel the reflection angle error and thereby reflect the radio wave RW at the target reflection angle. This makes it possible to accurately radiate the radio wave RW toward the transmission target.

Second Example Embodiment

Figure 9:
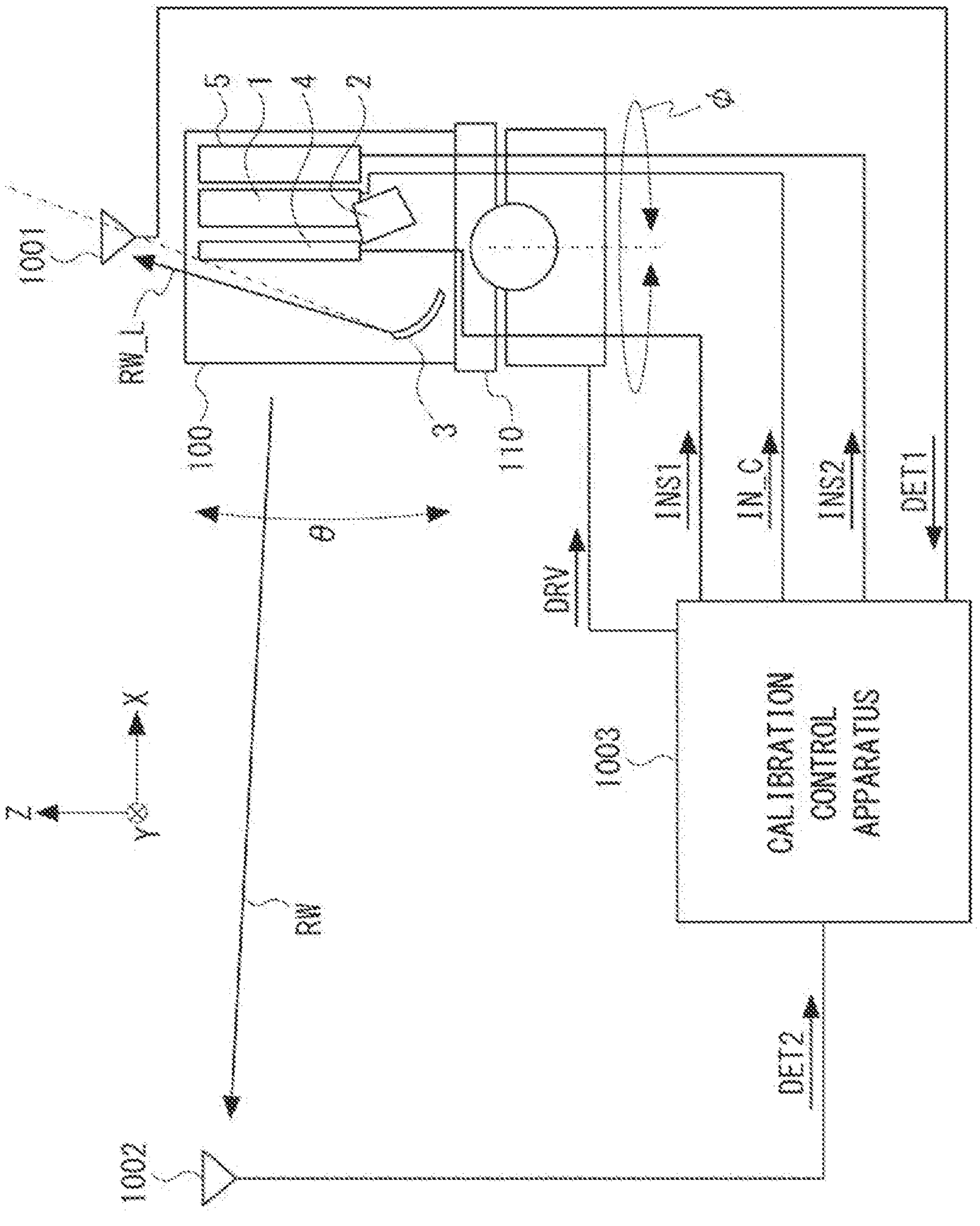
FIG. 9 is a diagram schematically illustrating a configuration of a calibration system according to a second example embodiment.

Next, a calibration system 1000 for performing calibration of the transmission apparatus 100 according to the first example embodiment will be described. FIG. 9 schematically illustrates a configuration of the calibration system 1000. The calibration system 1000 calibrates the reflection direction of the radio wave RW in the transmission apparatus 100, and includes a leakage radio wave detection antenna 1001, a radiation pattern measurement antenna 1002, and a calibration control apparatus 1003.

Further, in the present configuration, the transmission apparatus 100 is mounted on a stage 110 capable of displacing the posture of the transmission apparatus 100 in the tilt direction $\theta$ and the pan direction q.

The leakage radio wave detection antenna 1001 is configured as an antenna for detecting a radio wave, among the radio waves RW_P reflected by the first reflection unit 3 toward the second reflection unit 4, which is not reflected by the second reflection unit 4 and leaks to the rear of the second reflection unit 4. Therefore, the leakage radio wave detection antenna 1001 is disposed behind the second reflection unit 4, so as not to be completely obscured by the second reflection unit 4 when viewed from the first reflection unit 3. In this example, the leakage radio wave detection antenna 1001 is disposed above the second reflection unit 4, and is able to detect a radio wave RW_L leaking above the second reflection unit 4 among the radio waves RW_P. The leakage radio wave detection antenna 1001 outputs a leakage radio wave detection signal DET1 indicating a detection result of the leakage radio wave to the calibration control apparatus 1003.

The radiation pattern measurement antenna 1002 is configured as an antenna for measuring a radiation pattern of the radio wave RW radiated from the transmission apparatus 100. Therefore, the radiation pattern measurement antenna 1002 is disposed at a position spaced apart from the transmission apparatus 100 in the radiation direction of the radio wave RW radiated from the transmission apparatus 100. In order to suitably measure the radiation pattern, it is desirable to separate the radiation pattern measurement antenna 1002 from the second reflection unit 4, about 100 times the arrangement interval of the reflective element units. For example, in a case where the arrangement interval of the reflective element units is 5 mm, it is desirable to arrange the radiation pattern measurement antenna 1002 at a position spaced apart from the second reflection unit 4 by about 500 mm.

As long as the radiation pattern of the radio wave RW is able to be acquired, the radiation pattern measurement antenna 1002 may be a configuration in which a single antenna is moved or may use various antennas such as an array antenna. The radiation pattern measurement antenna 1002 outputs a radiation pattern detection signal DET2 indicating the detection result of the radiation pattern of the radio wave RW to the calibration control apparatus 1003.

Based on the leakage radio wave detection signal DET1 and the radiation pattern detection signal DET2, the calibration control apparatus 1003 detects a deviation in the reflection angle of the radio wave RW in the transmission apparatus 100, and calibrates the reflection angle of the radio wave RW in the transmission apparatus 100.

The calibration control apparatus 1003 is configured to output indication signals INS1 and INS2 to the second reflection unit 4 and the control unit 5, and output an input signal IN_C for calibration to the amplifier 1, and thereby cause the transmission apparatus 100 to perform an operation necessary for calibration. Further, the calibration control apparatus 1003 is able to displace the transmission apparatus 100 in the tilt direction θ and the pan direction φ by applying a drive signal DRV to the stage 110 and thereby drive the stage 110.

As described above, by operating the transmission apparatus 100 and the stage 110, the calibration control apparatus 1003 is able to measure the radiation pattern of the radio wave RW. That is, by receiving the radio wave RW by the radiation pattern measurement antenna 1002 while driving the transmission apparatus 100 in the tilt direction θ and the pan direction φ, and monitoring the radiation pattern detection signal DET2, the calibration control apparatus 1003 may measure the two-dimensional radiation pattern of the radio wave RW. Then, the calibration control apparatus 1003 may detect the deviation of the reflection angle of the radio wave RW, based on the acquired radiation pattern, and correct the deviation.

Further, the calibration control apparatus 1003 is also able to detect the presence or absence of a leakage radio wave, based on the leakage radio wave detection signal DET1. Thus, the attachment angle of the first reflection unit 3 may be corrected in such a way that a leaking radio wave does not occur. Correction of the attachment angle of the first reflection unit 3 may be performed manually, or may be performed by the calibration control apparatus 1003 driving a mechanism for driving the first reflection unit 3, in a case where the calibration control apparatus 1003 is provided with such a mechanism.

Next, a calibration operation based on the radiation pattern will be described. In the present example embodiment, a reference reflective element unit E_REF as a reference and a target reflective element unit E_OBJ as a calibration target are selected from among the reflective element units E1 to EN provided in the second reflection unit 4, and calibration is performed while moving a pair of the selected reflective element units.

Figure 10:
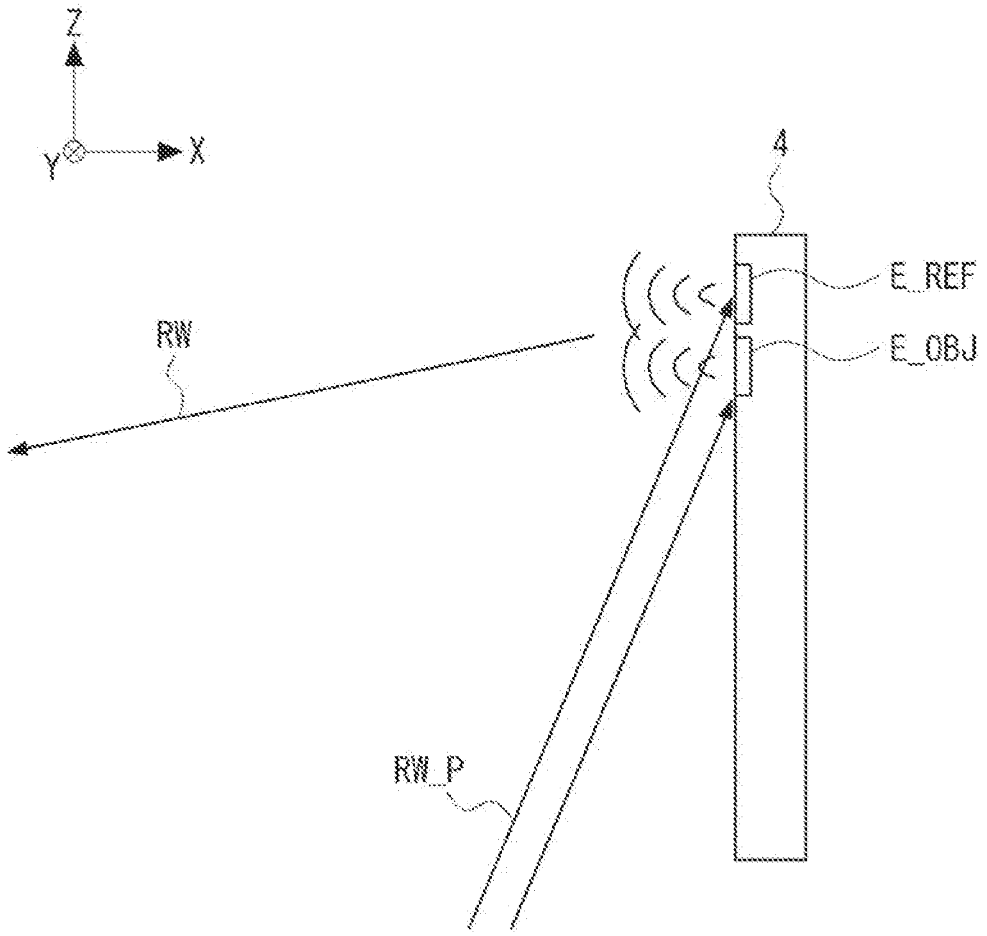
FIG. 10 is a diagram illustrating a reference reflective element unit and a target reflective element unit.

FIG. 10 illustrates the reference reflective element unit E_REF and the target reflective element unit E_OBJ. In the present example embodiment, among the plurality of reflective element units arranged in the second reflection unit 4, two adjacent reflective element units are selected as the reference reflective element unit E_REF and the target reflective element unit E_OBJ. Then, the radiation pattern of the radio wave RW generated by the interference of the radio waves reflected by the two reflective element units is measured.

Figure 11:
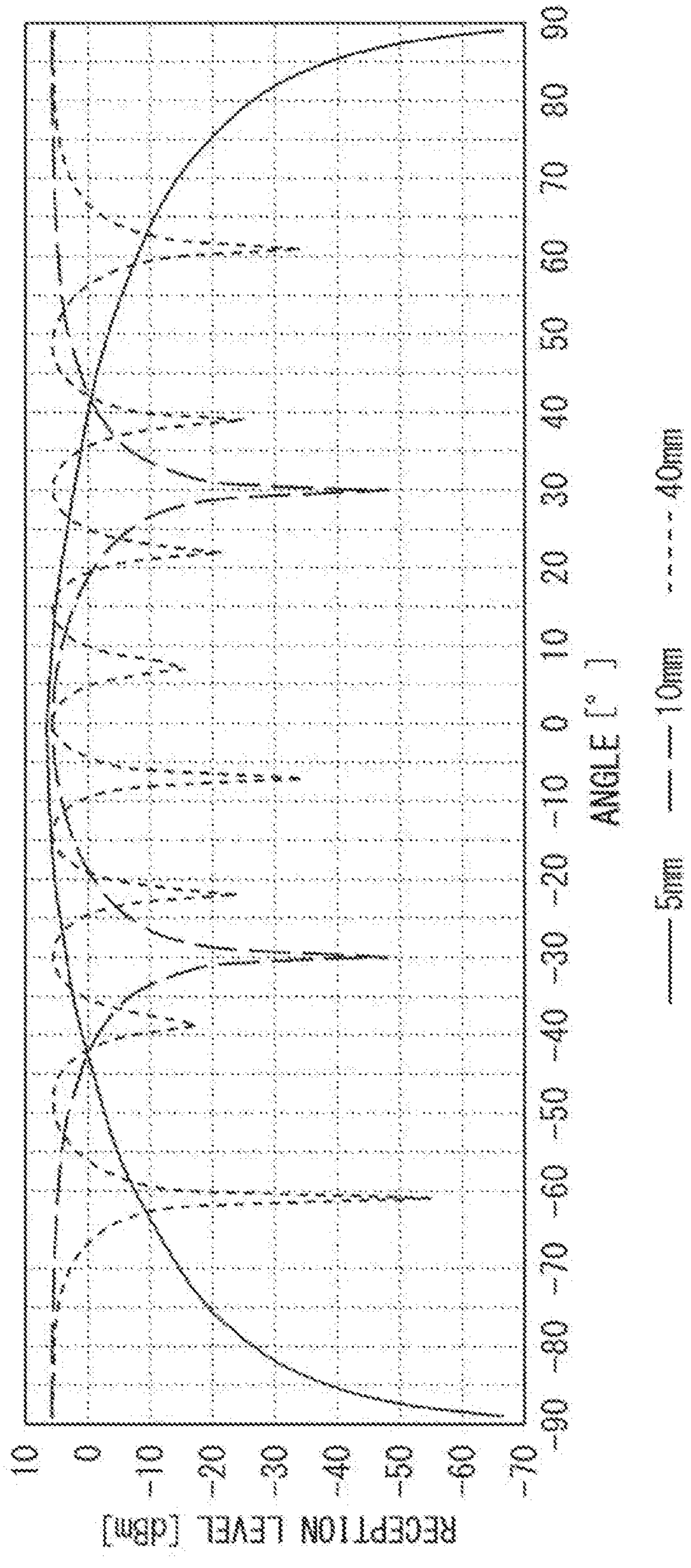
FIG. 11 is a diagram illustrating an example of a change in the radiation pattern with respect to the distance between two reflective element units.

Herein, the reason why two adjacent reflective element units are selected as the reference reflective element unit E_REF and the target reflective element unit E_OBJ is described. FIG. 11 illustrates an example of a change in the radiation pattern with respect to the distance between the two reflective element units. It can be seen that in a case where the distance between the two reflective element units is as small as 5 mm, a radiation pattern symmetrical in both directions around 0° may be acquired. Meanwhile, in a case where the distance between the two reflective element units is as large as 10 mm or 40 mm, the distance between the reference reflective element unit and the target reflective element unit becomes half wavelength or more, causing a grating lobe to be generated in the radiation pattern, thus becoming impossible to adjust the peak position. Therefore, it is desirable that the distance between the two reflective element units is as small as possible, and therefore it can be understood that fixing the reference reflective element unit to a specific single reflective element unit is not preferable. In the present example embodiment, in order to avoid such a situation, two adjacent reflective element units are selected as the reference reflective element unit E_REF and the target reflective element unit E_OBJ.

However, FIG. 11 is merely an example, and does not exclude, for example, selecting two non-adjacent reflective element units as the reference reflective element unit E_REF and the target reflective element unit E_OBJ, as long as an acceptable radiation pattern may be acquired.

Figure 12:
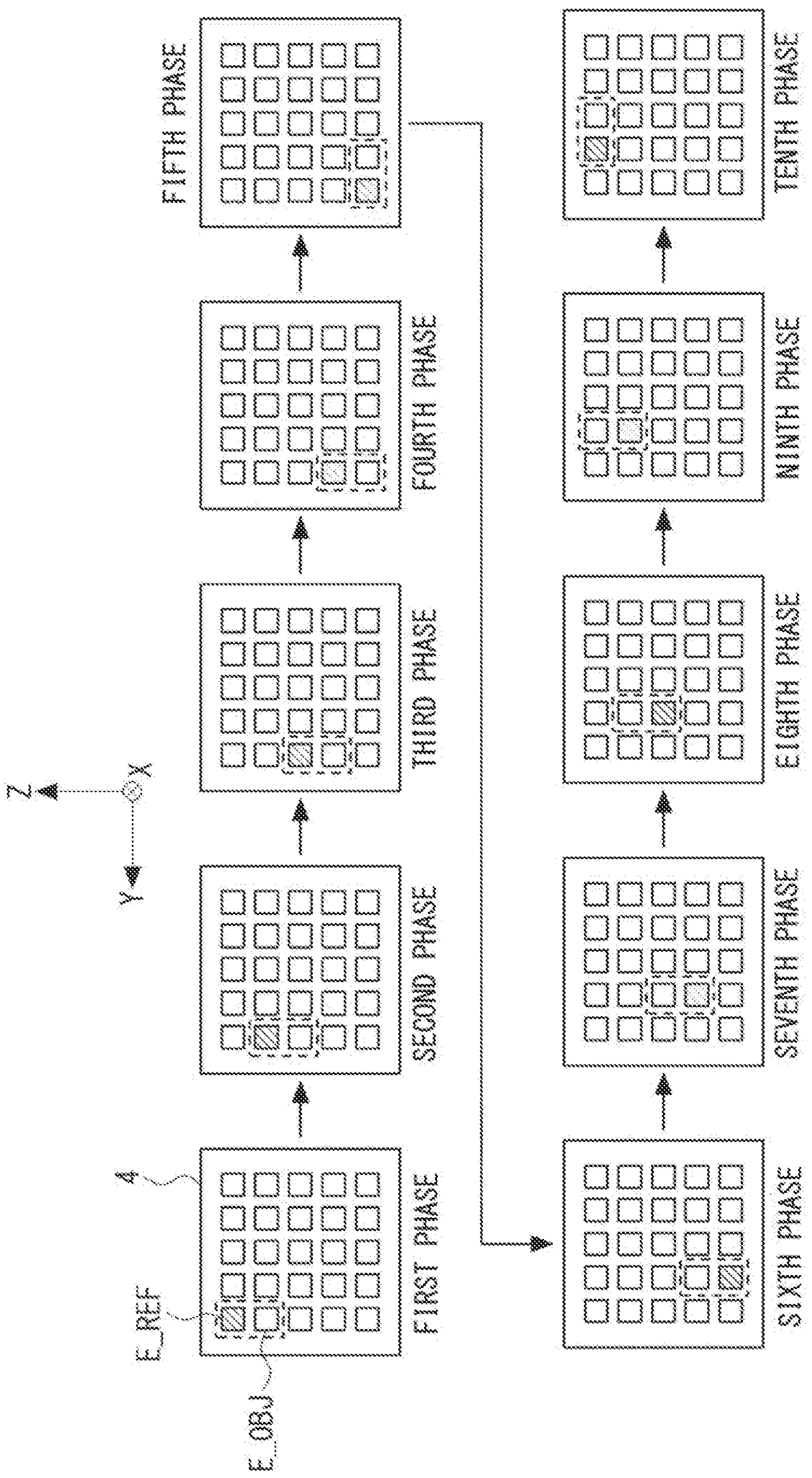
FIG. 12 is a diagram illustrating an example of a method for selecting the reference reflective element unit and the reflective element unit.

Next, a method for selecting the reference reflective element unit E_REF and the target reflective element unit E_OBJ will be described. FIG. 12 illustrates an example of a method for selecting the reference reflective element unit E_REF and the target reflective element unit E_OBJ. Herein, for the sake of simplification of the description, it is assumed that a total of 25 reflective element units of five rows and five columns are arranged in the second reflection unit 4, but this is merely an example, and the number of reflective element units is not limited to this.

In the present example, first, a reflective element unit in the corner among the reflective element units arranged in a grid pattern is selected as the reference reflective element unit E_REF, and a reflective element unit directly below the selected reference reflective element unit is selected as the target reflective element unit E_OBJ. In FIG. 12, as illustrated in the first phase, a reflective element unit in the upper left corner is selected as the reference reflective element unit E_REF, and a reflective element unit directly below the selected reference reflective element unit is selected as the target reflective element unit E_OBJ. After the target reflective element unit E_OBJ is calibrated in this combination, the reference reflective element unit E_REF and the target reflective element unit E_OBJ are reselected in order to change the target reflective element unit.

Herein, as in the second phase in FIG. 12, the target reflective element unit E_OBJ in the first phase immediately after calibration is selected as a new reference reflective element unit E_REF, and a reflective element unit directly below the newly selected reference refractive element unit is selected as the target reflective element unit E_OBJ. In this way, calibration of the target reflective element unit E_OBJ is performed while moving the pair of the reference reflective element unit E_REF and the target reflective element unit E_OBJ one by one.

Note that, when there is no target reflective element unit that may be selected as the target reflective element unit E_OBJ in the same column as in the fourth and ninth phases, a reflective element unit in the adjacent column from which a target reflective element unit is not yet selected may be selected as the target reflective element unit, as in the fifth and tenth phases.

In this way, by performing calibration while sweeping the target reflective element unit E_OBJ in the array of the reflective element units, it is possible to calibrate all the reflective element units of the second reflection unit 4.

Figure 13:
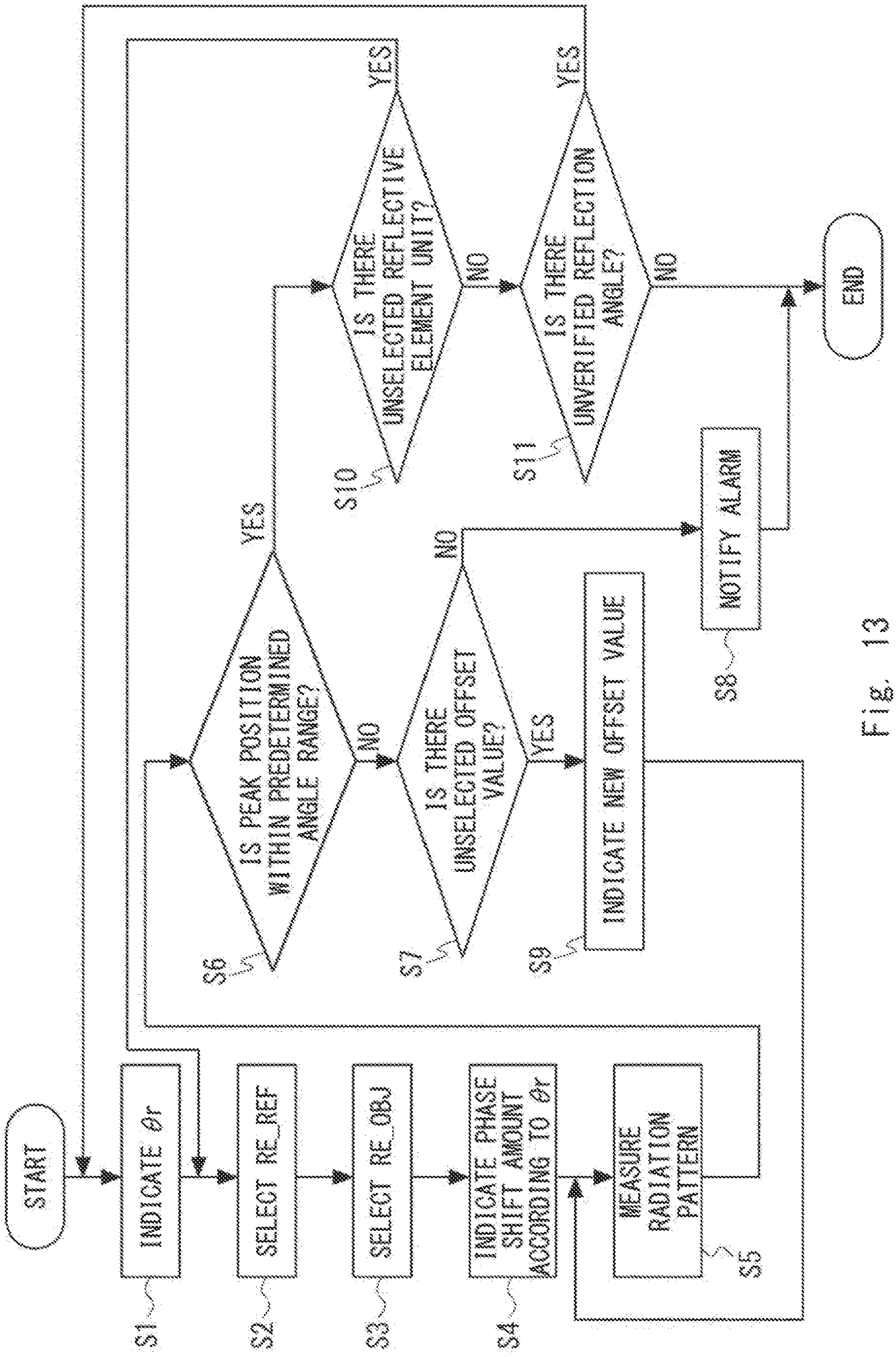
FIG. 13 is a flowchart of a calibration operation based on a radiation pattern.

Next, a calibration operation based on a radiation pattern will be specifically described. FIG. 13 illustrates a flowchart of a calibration operation based on a radiation pattern.

Step S1

The reflection angle $\theta_r$ to perform calibration is selected. The transmission apparatus 100 may be required to reflect radio waves in directions of a plurality of reflection angles, for example, 30°, 45°, and 60°. Therefore, in order to perform calibration with respect to each reflection angle and reflect radio waves in an appropriate direction in cases where each of the reflection angles is indicated, the reflection angle $\theta_r$ to be indicated to the transmission apparatus 100 is selected first.

Step S2

In order to perform the calibration, one reference reflective element unit E_REF is selected as a reference from among the reflective element units E1 to EN of the second reflection unit 4.

Step S3

Further, one target reflective element unit E_OBJ to be calibrated is selected from among the reflective element units E1 to EN of the second reflection unit 4.

In the reference reflective element unit E_REF and the target reflective element unit E_OBJ, the switch Sj is controlled to connect the antenna element Aj and the phase conversion unit Pj to each other. As a result, the reference reflective element unit E_REF and the target reflective element unit E_OBJ are in a state where radio waves may be reflected.

Meanwhile, in the reflective element units other than the reference reflective element unit E_REF and the target reflective element unit E_OBJ, the switch Sj is controlled to connect the antenna element Aj and a terminator to each other. In the other reflective element units, the switch Sj is controlled to connect the antenna element Aj and the terminator Tj to each other. As a result, the other reflective element units are in a state where radio waves are not reflected.

Thus, since only the reference reflective element unit E_REF and the target reflective element unit E_OBJ reflect the radio wave, it becomes possible to calibrate the reflection angle of the radio wave only for these two reflective element units.

Step S4

A phase shift amount according to the reflection angle $\theta_r$ is indicated to the reference reflective element unit E_REF and the target reflective element unit E_OBJ.

Step S5

Figure 14:
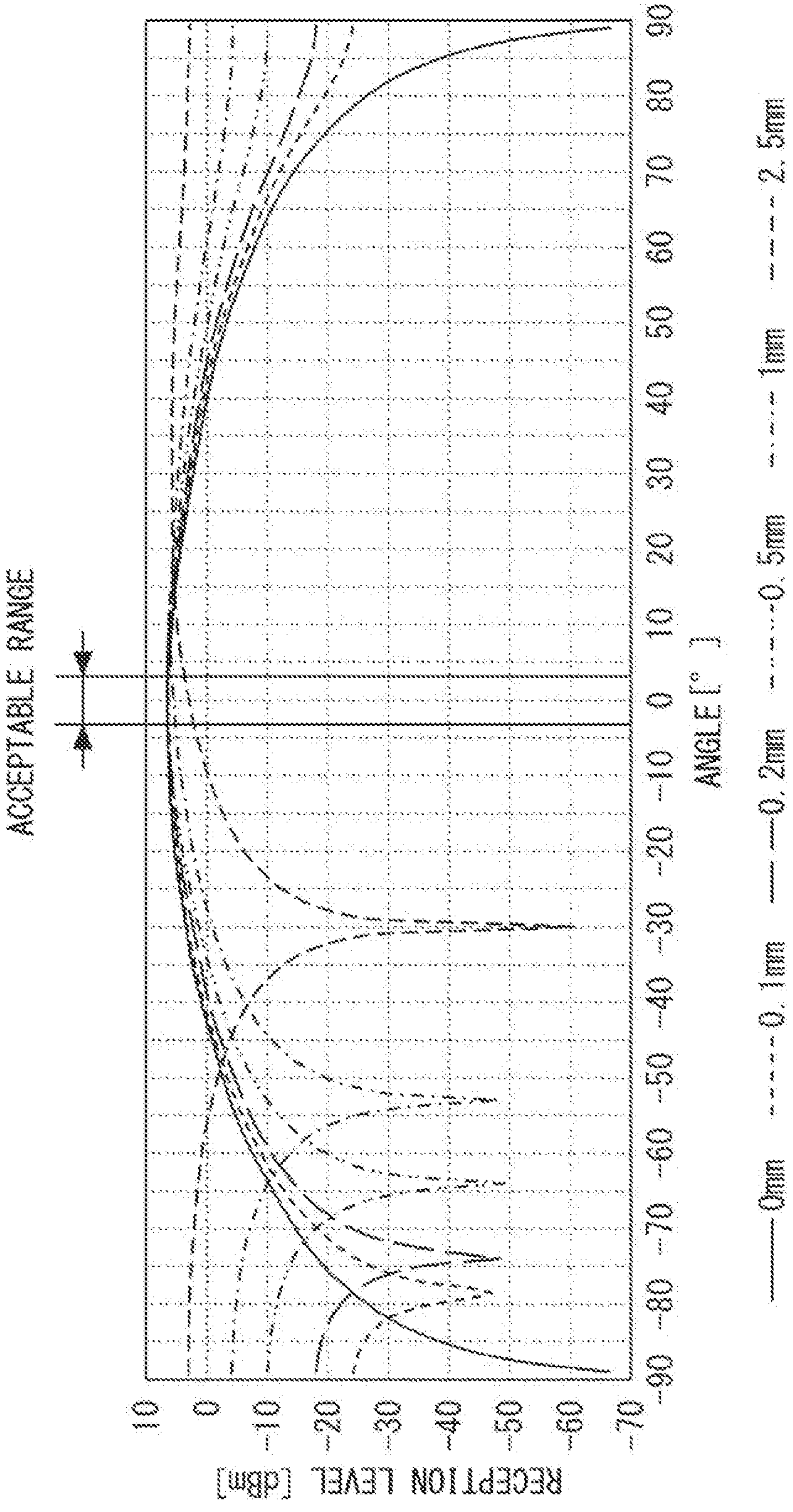
FIG. 14 is a diagram illustrating an example of a radiation pattern in a tilt direction.

In this state, to measure a radiation pattern, the radio waves are radiated from the reference reflective element unit E_REF and the target reflective element unit E_OBJ. FIG. 14 illustrates an example of a radiation pattern in a tilt direction θ. The present example illustrates a case where the difference between the line length of the reference reflective element unit E_REF and the line length of the target reflective element unit E_OBJ is ideally 0 mm, and cases where the line length difference is 0.1 mm, 0.5 mm, 1 mm and 2.5 mm as a comparative object affected by a manufacturing error or the like.

When there is a difference between the line length of the reference reflective element unit E_REF and the line length of the target reflective element unit E_OBJ, it can be noticed that the reflection direction of the radio wave RW changes due to a phase shift. In the present example, it can be seen that the peak of the radiation pattern moves in the +θ direction as the line length difference increases.

Step S6

The calibration control apparatus 1003 refers to the measured radiation pattern and determines whether the peak position falls within a predetermined angle range.

Step S7

When the peak position of the radiation pattern does not fall within the predetermined angle range, it is determined whether there is an unselected offset value in an offset value table.

Step S8

When there is no unselected offset value in the offset value table, it means that the reflection angle of the radio wave RW cannot be set to a desired angle even by all the offset values in the offset value table. Therefore, the calibration control apparatus 1003 issues an alarm indicating an abnormality, and ends the calibration operation.

Step S9

When there are unselected offset values in the offset value table, the calibration control apparatus 1003 selects one offset value from among the unselected offset values, indicates the selected offset value to the target reflective element unit E_OBJ, and returns the process to step S5.

Step S10

When the peak position of the radiation pattern falls within a predetermined angle range, it is determined whether there is an unadjusted reflective element unit, that is, a reflective element unit that is not selected as the target reflective element unit E_OBJ. When there is a reflective element unit that is not selected as the target reflective element unit E_OBJ, the process is returned to step S3.

Step S11

When there is no reflective element unit that is not selected as the target reflective element unit E_OBJ, it is determined whether there is an unverified reflection angle $\theta_r$. When there is an unverified reflection angle $\theta_r$, the process is returned to step S1. When there is no unverified reflection angle $\theta_r$, the calibration operation is terminated assuming that the calibration of the reflection angle of the radio wave has been completed for all of the reflective element units.

As described above, by sequentially calibrating the target reflective element unit while moving the pair of the reference reflective element unit and the target reflective element unit among the plurality of reflective element units provided in the second reflection unit 4, it is possible to suitably calibrate all of the reflective element units.

Third Example Embodiment

Figure 15:
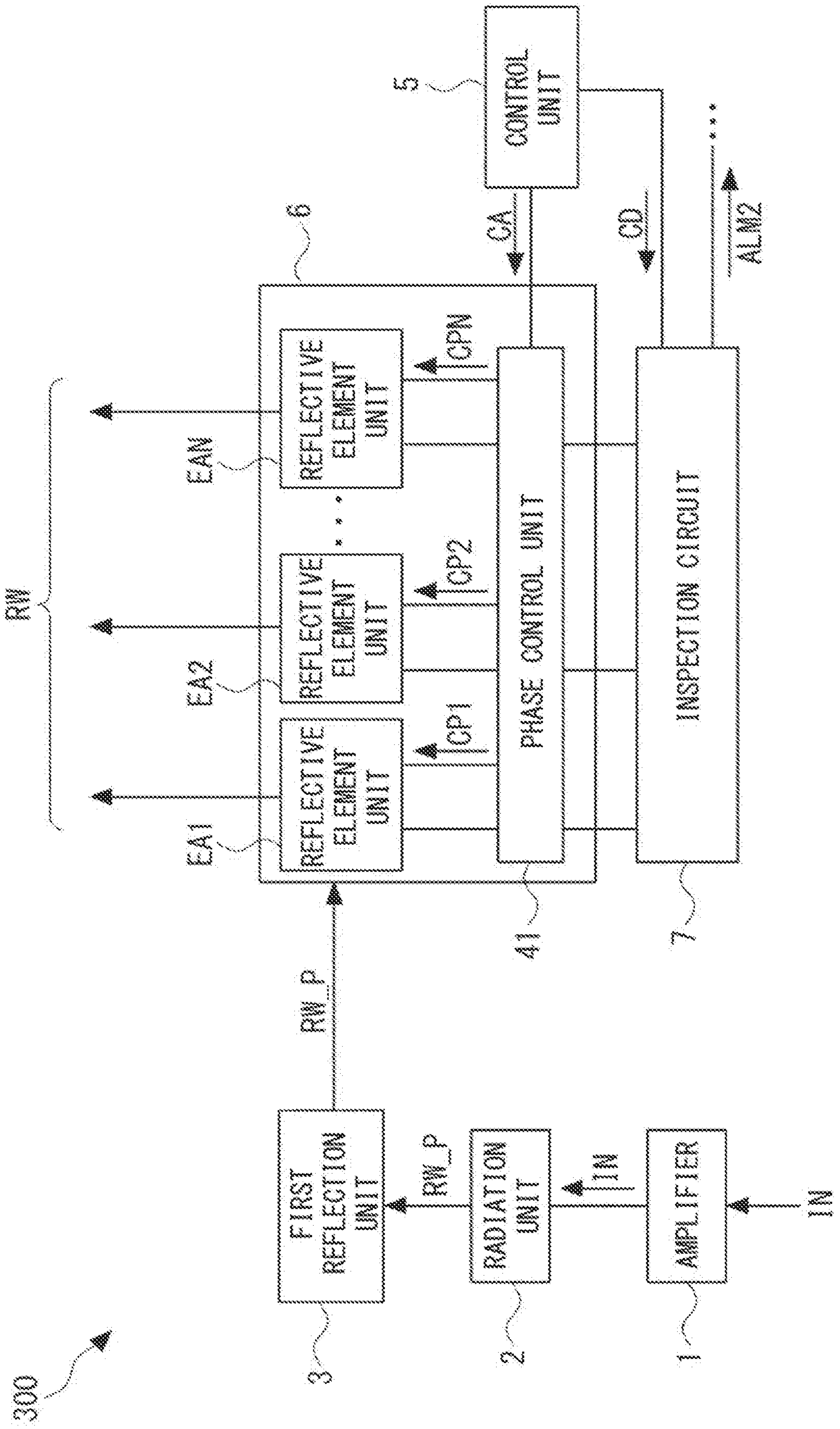
FIG. 15 is a diagram schematically illustrating a configuration of a transmission apparatus according to a third example embodiment.

In the present example embodiment, a self-inspection function of a transmission apparatus will be described. FIG. 15 schematically illustrates a configuration of a transmission apparatus 300 according to a third example embodiment. The transmission apparatus 300 has a configuration in which the second reflection unit 4 of the transmission apparatus 100 according to the first example embodiment is replaced with a second reflection unit 6, and an inspection circuit 7 is further added.

The second reflection unit 6 has a configuration in which the reflective element units E1 to EN of the second reflection unit 4 are replaced with reflective element units EA1 to EAN, respectively.

Figure 16:
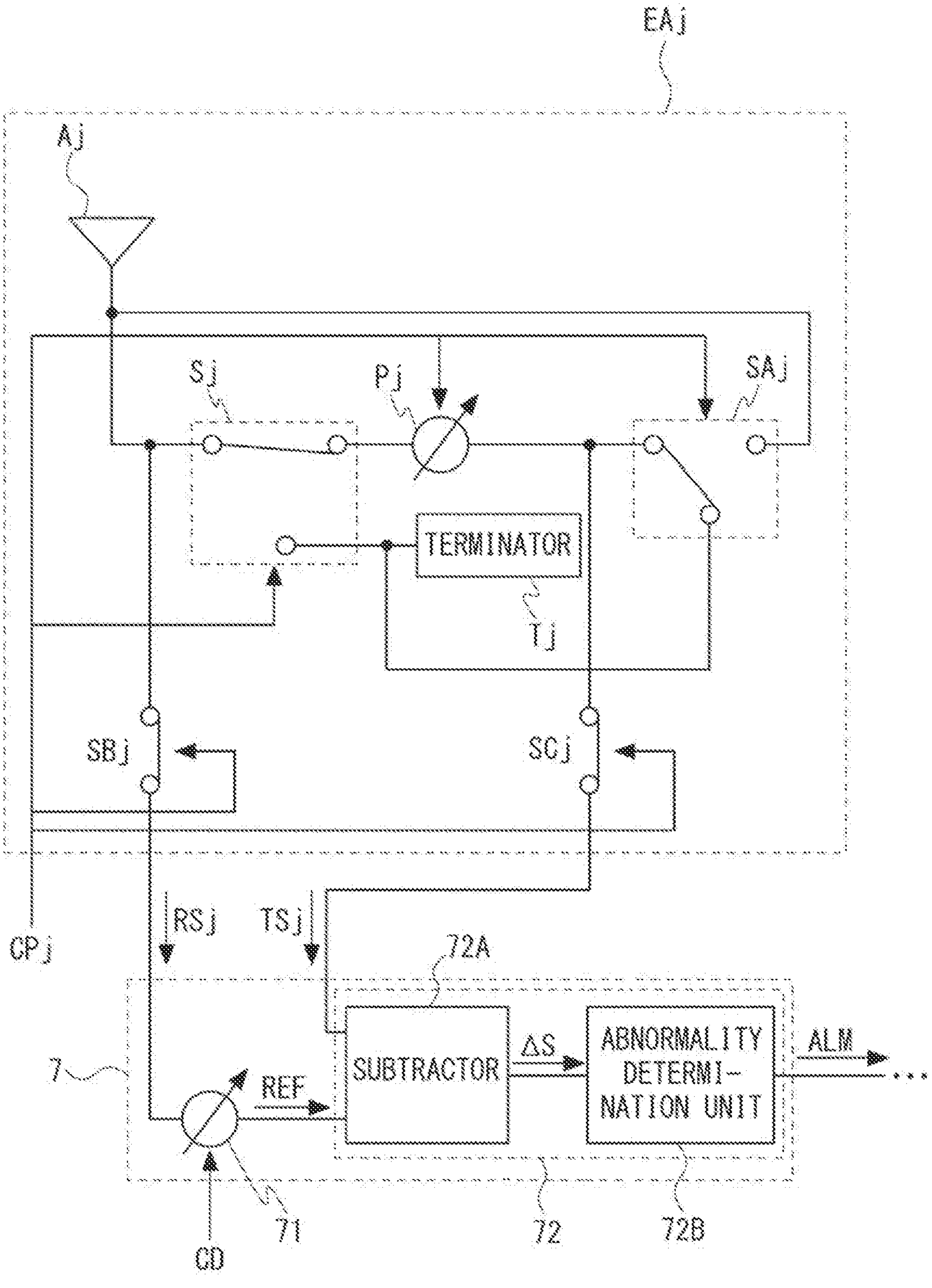
FIG. 16 is a diagram illustrating a circuit configuration of a reflective element unit and an inspection circuit.

FIG. 16 illustrates a circuit configuration of a reflective element unit EAj and the inspection circuit 7. The reflective element unit EAj has a configuration in which switches SAj to SCj are added to the reflective element unit Ej. The switch SAj is inserted in the subsequent stage of a phase conversion unit Pj, and may switch the propagation path of a transmission signal TSj to an antenna element Aj or a terminator Tj. When the switch SBj is turned on, a reception signal RSj from the antenna element Aj may be input to the inspection circuit 7. When the switch SCj is turned on, the transmission signal TSj output from the phase conversion unit Pj may be input to the inspection circuit 7.

In a case where the phase conversion unit Pj of the reflective element unit EAj is being inspected, the switch Sj connects the antenna element Aj and the phase conversion unit Pj, based on a control signal CPj. In addition, the switch SAj connects the phase conversion unit Pj and the terminator Tj, in such a way that the transmission signal TSj is terminated. Further, by turning on the switches SBj and SCj, the reception signal RSj and the transmission signal TSj are input to the inspection circuit 7.

In a case where the phase conversion unit Pj of the reflective element unit EAj is not being inspected, the switch SAj connects the phase conversion unit Pj and the antenna element Aj to each other. Further, the switches SBj and SCj are turned off.

The inspection circuit 7 includes a phase conversion unit 71 for inspection, and a determination unit 72.

The phase conversion unit 71 for inspection is configured as a phase conversion unit capable of selecting a plurality of phase shifters having a fixed path length, in accordance with a control signal CD, and is able to apply a phase shift amount fixed to the same value as the phase shift amount to be originally given, to the reception signal RSj being input from the reflective element unit to be inspected. A phase conversion unit capable of selecting a plurality of phase shifters having a fixed path length may apply various general configurations, for example, a configuration illustrated in [FIG. 2, Schematic diagram of a three-bit phase shifter using a three-switched-line phase shifter] described in [The Institute of Electronics, Information and Communication Engineers Knowledge Base, Group 10, Chapter 8, Section 8, Phase shifters and Antennas], 2022, The Institute of Electronics, Information and Communication Engineers, searched on the Internet on Dec. 16, 2022<URL: https://www.ieice-hbkb.org/files/10/10gun_08hen_08.pdf>.

The determination unit 72 compares the transmission signal TSj to which the phase shift amount indicated by the phase conversion unit Pj of the reflective element unit to be inspected is applied, with a reference signal REF to which a fixed phase shift amount is applied by the phase conversion unit 71 for inspection, and determines whether a desired phase shift amount is applied to the transmission signal TSj by the phase conversion unit Pj. When a desired phase shift amount is not applied to the transmission signal TSj by the phase conversion unit Pj, the determination unit 72 outputs an alarm indicating an abnormality of the phase conversion unit Pj.

For example, as illustrated in FIG. 16, the determination unit 72 includes a subtractor 72A and an abnormality determination unit 72B. For example, the subtractor 72A subtracts the reference signal REF from the transmission signal TSj, and outputs a difference signal $\Delta S$ obtained by the subtraction to the abnormality determination unit 72B. The abnormality determination unit 72B compares the level L of the difference signal $\Delta S$ with a predetermined threshold value TH, and outputs an alarm ALM when the level L is larger than the threshold value TH, assuming that an abnormality has occurred in the phase conversion unit Pj.

As described above, according to the present configuration, it is possible to inspect whether the phase shift amount in the phase conversion unit of each of the reflective element units is a desired value by using the inspection circuit. Thus, the abnormality of the reflective element unit may be detected at an early stage. Further, even after the operation of the transmission apparatus 100 is started, the inspection may be performed at a desired timing.

Other Example Embodiments

Note that, the present disclosure is not limited to the above-described example embodiments, and may be appropriately modified without departing from the spirit. For example, the transmission apparatus 300 according to the third example embodiment has been described as a modified example of the transmission apparatus 100 according to the first example embodiment, but this is merely an example. That is, it goes without saying that the calibration system 1000 according to the second example embodiment may be applied to the transmission apparatus 300 to perform the calibration operation in a similar manner.

The configuration of the inspection circuit described in the third example embodiment is merely an example, and as long as it is possible to inspect whether the phase shift amount applied to the transmission signal from each of the reflective element units is a desired value, other configurations may be applied as appropriate.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

Some or all of the above-described example embodiments may be described as the following supplementary notes, but are not limited thereto.

(Supplementary Note 1)

A transmission apparatus including: an amplifier configured to amplify an input signal; a radiation unit configured to radiate a radio wave into space, based on the input signal amplified by the amplifier; a first reflection unit configured to reflect the radio wave radiated from the radiation unit; a second reflection unit configured as a reconfigurable intelligent metasurface (RIS) reflecting plate to reflect the radio wave from the first reflection unit and thereby transmit the radio wave to a transmission target; and a control unit configured to control the second reflection unit, in which the second reflection unit reflects the radio wave at a reflection angle acquired by adding an offset to a reflection angle that indicated by the control unit based on the target reflection angle that represents a reflection angle toward the transmission target to reflect the radio wave at the target reflection angle.

(Supplementary Note 2)

The transmission apparatus according to supplementary note 1, in which the second reflection unit includes a plurality of reflective element units arranged two-dimensionally, and a phase control unit configured to control reflection of the radio wave in each of the plurality of reflective element units; the reflective element unit includes an antenna element configured to receive the radio wave radiated from the radiation unit and output a reception signal, and a phase conversion unit configured to output, to the antenna element, a transmission signal acquired by applying a predetermined phase shift amount according to a control signal provided from the phase control unit to a phase of the reception signal; and the phase control unit applies an offset to the phase shift amount in the phase conversion unit in such a way that the second reflection unit reflects the radio wave according to a reflection angle indicated by the control unit.

(Supplementary Note 3)

The transmission apparatus according to supplementary note 2, in which the phase control unit has table information in which a phase offset to be applied to the phase shift amount according to the target reflection angle is stored, and the phase control unit determines the phase offset by referring to the table information, according to the target reflection angle indicated by the control unit.

(Supplementary Note 4)

The transmission apparatus according to supplementary note 2 or 3, further including an inspection circuit configured to inspect the phase shift amount applied to the transmission signal, in which each of the plurality of reflective element units includes a terminator, a first switch inserted between the antenna element and the phase conversion unit and between the antenna element and the terminator, and configured to switch an input destination of the reception signal to the phase conversion unit or the terminator, a second switch configured to switch an output destination of the transmission signal being output from the phase conversion unit to the antenna element or the terminator, a third switch inserted between the antenna element and the inspection circuit, and configured to open/close an input path of the reception signal to the inspection circuit, and a fourth switch inserted between an output from the phase conversion unit and the inspection circuit, and configured to open/close an input path of the transmission signal to the inspection circuit; and, in a state where the antenna element and an input of the phase conversion unit are connected by the first switch, an output of the phase conversion unit and the terminator are connected by the second switch, and the third and fourth switches are closed, the inspection circuit compares a signal acquired by applying the phase shift amount being a fixed value to the reception signal with the transmission signal, and detects whether a phase difference between a signal acquired by applying the phase shift amount being the fixed value to the reception signal and the transmission signal is larger than a predetermined amount.

(Supplementary Note 5)

The transmission apparatus according to any one of supplementary notes 1 to 4, in which the amplifier is configured as a traveling-wave tube amplifier.

(Supplementary Note 6)

A calibration system for a transmission apparatus including: a calibration control apparatus configured to control calibration of the plurality of reflective element units of the transmission apparatus according to any one of supplementary notes 2 to 5; a leakage radio wave detection antenna configured to detect a radio wave being reflected by the first reflection unit and then leaking out without being reflected by the second reflection unit; and a radiation pattern measurement antenna configured to acquire a radiation pattern of a radio wave reflected by the second reflection unit, in which the calibration control apparatus indicates, to the phase control unit, a phase offset to be selected, in such a way that the leakage radio wave becomes smaller than a predetermined level and a peak of the radiation pattern falls within a predetermined angle range.

(Supplementary Note 7)

The calibration system for a transmission apparatus according to supplementary note 6, in which the calibration control apparatus performs: selecting one reference reflective element unit and a target reflective element unit to be calibrated from among the plurality of reflective element units; indicating, to the phase control unit, a calibration target reflection angle; acquiring a radiation pattern by reflecting a radio wave reflected by the first reflection unit only by the reference reflective element unit and the target reflective element unit; and calibrating the target reflective element unit by indicating, to the phase control unit, a phase offset to be indicated to the target reflective element unit, in such a way that a peak of the radiation pattern falls within a predetermined range based on the calibration target reflection angle.

(Supplementary Note 8)

The calibration system for a transmission apparatus according to supplementary note 7, in which the calibration control apparatus selects two of the adjacent reflective element units as the reference reflective element unit and the target reflective element unit.

(Supplementary Note 9)

The calibration system for a transmission apparatus according to supplementary note 7 or 8, in which the calibration control apparatus selects two of the adjacent reflective element units as the reference reflective element unit and the target reflective element unit.

(Supplementary Note 10)

The calibration system for a transmission apparatus according to any one of supplementary notes 7 to 9, in which the calibration control apparatus repeats selection of a reference reflective element unit and a target reflective element unit in such a way that each of reflective element units other than the reflective element unit initially selected as a reference reflective element unit is selected as a target reflective element unit, and thereby calibration of each of the target reflective element units is performed.

(Supplementary Note 11)

The calibration system for a transmission apparatus according to supplementary note 10, in which the calibration control apparatus selects a reflective element unit being the previous target reflective element unit for which calibration has been completed, as a next reference reflective element unit.

(Supplementary Note 12)

The calibration system for a transmission apparatus according to any one of supplementary notes 7 to 11, in which each of the plurality of reflective element units further includes: a terminator; and a first switch inserted between the antenna element and the phase conversion unit and between the antenna element and the terminator, and configured to switch an input destination of the reception signal to the phase conversion unit or the terminator, in which, in the reference reflective element unit and the target reflective element unit, the first switch connects the antenna element and the phase conversion unit, and in a reflective element unit other than the reference reflective element unit and the target reflective element unit, the first switch connects the antenna element and the terminator.

(Supplementary Note 13)

A transmission method for a transmission apparatus, the transmission apparatus including: an amplifier configured to amplify an input signal; a radiation unit configured to radiate a radio wave into space, based on the input signal amplified by the amplifier; a first reflection unit configured to reflect the radio wave radiated from the radiation unit; and a second reflection unit configured to reflect the radio wave from the first reflection unit and thereby transmit the radio wave to a transmission target, the transmission method including: indicating, to the second reflection unit, a reflection angle acquired by adding an offset to a reflection angle indicated based on a target reflection angle representing a reflection angle toward the transmission target; and reflecting the radio wave by the second reflection unit, based on the indicated reflection angle, to reflect the radio wave at the target reflection angle.

What is claimed is:

1. A transmission apparatus comprising:

an amplifier configured to amplify an input signal;

a radiation unit configured to radiate a radio wave into space, based on the input signal amplified by the amplifier;

a first reflection unit configured to reflect the radio wave radiated from the radiation unit;

a second reflection unit configured as a reconfigurable intelligent metasurface (RIS) reflecting plate to reflect the radio wave from the first reflection unit and thereby transmit the radio wave to a transmission target; and a control unit configured to control the second reflection unit, wherein the control unit instructs, to the second reflection unit, a target reflection angle of the radio wave set to the second reflection unit to transmit the radio wave to the transmission target and an offset angle for cancelling an error between the target reflection angle and a first reflection angle of the radio wave in a case where the radio wave is reflected by setting the target reflection angle to the second reflection unit, and the second reflection unit reflects the radio wave at a second reflection angle obtained by adding the offset angle to the target reflection angle.

2. The transmission apparatus according to claim 1, wherein the second reflection unit includes a plurality of reflective element units arranged two-dimensionally, and a phase control unit configured to control reflection of the radio wave in each of the plurality of reflective element units, each of the plurality of reflective element units includes an antenna element configured to receive the radio wave radiated from the radiation unit and output a reception signal, and a phase conversion unit configured to output, to the antenna element, a transmission signal acquired by applying a predetermined phase shift amount according to a control signal provided from the phase control unit to a phase of the reception signal, and the phase control unit applies an offset to the phase shift amount in the phase conversion unit in such a way that the second reflection unit reflects the radio wave at the second angle.

3. The transmission apparatus according to claim 2, wherein the phase control unit has table information in which a phase offset to be applied to the phase shift amount according to the target reflection angle is stored, and the phase control unit determines the phase offset by referring to the table information, according to the target reflection angle indicated by the control unit.

4. The transmission apparatus according to claim 2, further comprising an inspection circuit configured to inspect the phase shift amount applied to the transmission signal, wherein each of the plurality of reflective element units includes a terminator, a first switch inserted between the antenna element and the phase conversion unit and between the antenna element and the terminator, and configured to switch an input destination of the reception signal to the phase conversion unit or the terminator, a second switch configured to switch an output destination of the transmission signal being output from the phase conversion unit to the antenna element or the terminator, a third switch inserted between the antenna element and the inspection circuit, and configured to open/close an input path of the reception signal to the inspection circuit, and a fourth switch inserted between an output from the phase conversion unit and the inspection circuit, and configured to open/close an input path of the transmission signal to the inspection circuit, and, in a state where the antenna element and an input of the phase conversion unit are connected by the first switch, an output of the phase conversion unit and the terminator are connected by the second switch, and the third and fourth switches are closed, the inspection circuit compares a signal acquired by applying the phase shift amount being a fixed value to the reception signal with the transmission signal, and detects whether a phase difference between a signal acquired by applying the phase shift amount being the fixed value to the reception signal and the transmission signal is larger than a predetermined amount.

5. The transmission apparatus according to claim 1, wherein the amplifier is configured as a traveling-wave tube amplifier.

6. A transmission method for a transmission apparatus, the transmission apparatus including:

an amplifier configured to amplify an input signal;

a radiation unit configured to radiate a radio wave into space, based on the input signal amplified by the amplifier;

a first reflection unit configured to reflect the radio wave radiated from the radiation unit;

a second reflection unit configured to reflect the radio wave from the first reflection unit and thereby transmit the radio wave to a transmission target, and a control unit configured to control the second reflection unit, the transmission method comprising:

instructing, by a control unit, to the second reflection unit, a target reflection angle of the radio wave set to the second reflection unit to transmit the radio wave to the transmission target and an offset angle for cancelling an error between the target reflection angle and a first reflection angle of the radio wave in a case where the radio wave is reflected by setting the target reflection angle to the second reflection unit, and reflecting, by the second reflection unit, the radio wave at a second reflection angle obtained by adding the offset angle to the target reflection angle.

* * * * *